Patented June 14, 1938

2,120,723

UNITED STATES PATENT OFFICE 2,120,723

PREPARATION OF HYDROCARBON POLYMERIZING CATALYSTS

Kenneth M. Watson, Chicago, Ill., assignor to Universal Oil Products Company, Chicago, Ill., a corporation of Delaware No Drawing. Application October 18, 1935,
Serial No. 45,642

2 Claims. (Cl. 23—233)

This invention relates to the preparation of catalysts used in the polymerization of olefinic hydrocarbons which are normally gaseous at ordinary temperatures and pressures.

Olefinic hydrocarbons with which the present invention is concerned occur along with corresponding paraffinic or saturated hydrocarbons in commercial hydrocarbon mixtures such as those encountered in the cracking of petroleum, in gas making processes and as by-products in various chemical industries. In general they are more chemically active than other classes of hydrocarbons, particularly if they contain more than one double bond or triple bond between carbon atoms. Even when under mild catalytic influence they exhibit this reactivity in their pronounced tendency to polymerize and form substances of higher molecular weight.

Olefins occur in particularly large percentages in the fixed gases from cracking processes as well as in the gasoline boiling range fractions. The fixed gases are utilized principally as fuel, only a very small percentage of present day commercial production being subjected to processes for the recovery or utilization of the olefinic constituents. The manufacture of secondary alcohols, such as iso-propyl alcohol and others, by first absorbing the corresponding olefins in cracked gases in sulfuric acid and then hydrolyzing the acid esters, has been undertaken to a limited extent. The olefins present in cracked hydrocarbon mixtures of gasoline boiling range are of moderately high antiknock value, but a certain percentage of these is too highly unsaturated, and these must be removed by chemical treatment, usually with sulfuric acid, to insure proper stability of the gasoline under storage conditions.

The present process provides for more effectively utilizing the olefinic constituents of commercial hydrocarbon mixtures, particularly those occurring in the gases from oil cracking processes to produce valuable derivatives therefrom and it may also be applied to individual olefins produced by special chemical methods or by fractionation of mixtures.

In one specific embodiment the invention comprises treatment of normally gaseous olefin hydrocarbons at elevated temperatures to produce polymers therefrom utilizable as constituents of motor fuel with solid contact materials or catalysts comprising phosphoric acid and siliceous carrying or spacing materials of a porous and adsorptive character, the catalyst particles being employed in definite shapes of uniform size.

The following table is introduced to show the general character of the compounds treated by the present process. It is not complete but is introduced as a matter of reference.

Olefin hydrocarbons

| Compound | Formula | Boiling point °C. |
|---|---|---|
| Ethylene | $CH_2=CH_2$ | −105 |
| Propylene | $CH_3CH=CH_2$ | −48 gaseous |
| Ethyl ethylene | $CH_3CH_2CH=CH_2$ | −5 |
| Plane-sym. (dimethyl ethylene) Axial-sym. (butene) | $CH_3.CH=CH.CH_3$ | +1 / 2.5 |
| Unsym. dimethyl ethylene (iso-butylene) | $(CH_3)_2C=CH_2$ | −6 |
| n.-Propyl ethylene (α-amylene.) | $CH_3CH_2CH_2CH=CH_2$ | +39 |
| Isopropyl ethylene (α-isoamylene.) | $(CH_3)_2CH.CH=CH_2$ | +21 |
| Sym. methyl ethyl ethylene (β-amylene) | $CH_3.CH_2.CH=CH.CH_3$ | +36 |
| Unsym. methyl ethyl ethylene (γ-amylene.) | $CH_3.CH_2$ \ $C=CH_2$ / $CH_3$ | +31 |
| Trimethyl ethylene (β-isoamylene) | $(CH_3)_2C=CH.CH_3$ | +36 |
| Tetramethyl ethylene | $(CH_3)_2C=C(CH_3)_2$ | +73 |

The boiling points given in the table indicate that the four carbon atom members are gaseous at ordinary temperatures and that the five carbon atom members may readily exist in minor proportions in commercial gas mixtures, such as the cracked hydrocarbon gas mixtures with which the present invention is specially concerned.

The present process is particularly directed to the production of dimers and trimers from monoolefins, particularly such olefins whose lower polymers boil at temperatures within the approximate range of commercial motor fuel, say, for example, from 100 to 400° F. It has been found that the dimers and some of the trimers of propylene, the butylenes and amylenes boil within this range and furthermore that these compounds have unusually high antiknock characteristics. The following table shows the approximate boiling points of the dimers of propylene, butylenes, amylenes and hexylenes which will occur in appreciable quantities in the gases from oil cracking processes.

Boiling points of olefin dimers

| | °F. |
|---|---|
| Hexylene | 155 |
| Octylene | 255 |
| Decylene | 323 |
| Dodecylene | 417 |

Of the lower boiling and normally gaseous olefins, ethylene is the most resistant to polymerization by catalysts of the present character, but in the presence of its higher homologues it is possible that a certain amount of mixed polymers are formed.

Polymers of higher molecular weight than the di- and tri-molecular compounds are generally of too high boiling point to be used in commercial gasolines and the end products of too extensive polymerization are resinous pitchy solids which are entirely unsuitable.

The essential ingredient of the composite solid catalysts which are employed in polymerizing olefins according to the present process is a phosphoric acid, which may constitute 80% of the catalyst mixture, and is usually greater than 50% by weight thereof although in some instances percentages as low as about 30% may be employed. Of the various acids of phosphorus, orthophosphoric acid ($H_3PO_4$), and pyrophosphoric acid ($H_4P_2O_7$) are generally preferred as constituents of the primary mixes on account of their cheapness and the readiness with which they may be procured although the invention is not restricted to their use but may employ any of the other acids of phosphorus insofar as they are adaptable.

It is one of the principal features of the present invention to employ ordinarily liquid phosphoric acids as polymerizing catalysts in substantially solid form and in regular and graded particle sizes, this being accomplished by the alternative use of a number of different absorbent carrying materials which vary somewhat in their absorptive capacity and also in their chemical and physical properties and their influence upon the catalytic effect of the mixtures. The processes by which the catalyst particles are produced in regular shapes and sizes will be described in detail in a later paragraph.

The materials which may be employed as absorbents and carriers in the initial mixes with phosphoric acids are divisible roughly into two classes. The first class comprises materials of a predominately siliceous character and includes diatomaceous earth, kieselguhr and artificially prepared porous silica. In the case of naturally occurring diatoms it is believed that they sometimes contain minor amounts of highly active aluminum oxide which in some instances seems to contribute to the total catalytic effect of the solid catalyst. This active material is not present in the artificially prepared forms of silica.

The second class of materials which may be employed either alone or in conjunction with the first class (and with certain other optional ingredients to be later described) comprises generally certain members of the class of aluminum silicates and includes such naturally occurring substances as the various fuller's earths and clays such as bentonite, montmorillonite, etc. The class also includes certain artificially prepared aluminum silicates of which a purified aluminum silicate made by treating certain selected clays with hydrochloric or other mineral acid and washing out the reaction products is representative. The naturally occurring substances in this general class are characterized by a high absorptive capacity which is particularly in evidence in making up the present type of phosphoric acid catalyst, and they may also contain traces of active ingredients which assist in producing the desired polymerizing effects. Again each substance which may be used alternatively will exert its own specific influence which will not necessarily be identical with that of the other members of the class.

It has appeared that in some cases the structure of the solid phosphoric acid catalyst forms as finally produced may be improved by incorporation in the primary mixes of organic materials which yield a carbonaceous residue on heating. Substances which may be used in this manner include such materials as cellulose, starches, sugars, glue, gelatin, flour, molasses, agar-agar, etc. They evidently function as binders to some extent to prevent the breakdown of the catalyst structure when subjected to elevated temperatures and the action of hydrocarbon vapors or liquids in service. It is also possible that they cause an increased porosity due to the voids which remain after their removal by burning. It is frequently noted that regenerated catalysts which had no carbonaceous materials added to the original mixes, but which had such materials deposited on their surfaces and in their pores during their use as polymerizing catalysts, have greater catalytic activity after regeneration than they had when fresh.

The usual steps in preparing catalyst particles to be used to polymerize gaseous olefins according to the present process may be briefly summarized as follows: (1) A selected absorbent from the classes already mentioned and with or without the addition of carbonaceous materials is mixed with a definite proportion of a phosphoric acid until a mass of uniform pasty consistency is obtained; (2) The paste is made into the desired forms either by extrusion from perforated plates and cutting into lengths or by any other suitable process of compacting or pelleting; (3) The forms are subjected to a calcining operation to volatilize a sufficient amount of water to produce a phosphoric acid of the required composition corresponding to a maximum polymerizing effectiveness. While the general process may be thus briefly indicated, there are certain limitations of operation and precautions which should be observed which will be elaborated in the paragraphs following.

In regard to step 1 the procedure will be varied somewhat depending upon the acid employed in the initial mixes. Orthophosphoric acid is sufficiently liquid at ordinary temperatures so that it can be mixed with absorbents without great difficulty if efficient mixing devices are employed. When this acid is employed, a longer period of calcining is necessary because the acid corresponding to maximum polymerizing effectiveness has been found to be one lying just above the pyro acid in respect to the ratio of phosphorus pentoxide to combined water. It may be necessary, for example, to heat mixes made with orthophosphoric acid at temperatures of approximately 300° C. for 40–60 hours before a satisfactory dehydration is accomplished. It is therefore more generally practical to start with the pyrophosphoric acid which, however, must be heated to temperatures of approximately 160–180° C. to insure a good fluidity and ready mixing with the absorbent chosen. Such mixes, however, may be brought to the optimum acid composition in much less time, usually less than 20 hours.

Step 2 is preferably conducted so that forms are produced with a minimum of compression in order to preserve the porosity of the final particles. For this reason the general methods of extrusion are preferable over those involving pelleting, particularly if the initial pasty mixtures are inclined to be wet on account of the use of relatively high percentages of the liquid acids. The methods of extruding pasty materials and cutting the extruded material into definite lengths are more or less well known in the industries and a detailed description of the various types of processes is not necessary.

The use of catalyst particles of regular shape and uniform size is an important feature of the present process. When making up solid phosphoric acid catalysts by merely heating the initial pastes to produce solid cakes which are ground and sized, there is an unavoidable production of particles of graded size, even when relatively narrow ranges of diameters are selected for use. When using, for example, particles corresponding to approximately 4–20 mesh there is a well recognized tendency for packing to occur so that the percentage of voids is much lower than when particles of uniform size are employed. This tendency to packing is further accentuated by the fact that the particles are inherently irregular in shape.

In regard to the shapes which may be employed, a number are utilizable, the simplest being cylindrical or prismatic, including short cylinders or hollow cylinders, either form having a corrugated surface. Rectangular forms are in general to be avoided because it is geometrically possible for them to pack solid and there will be a tendency to channeling. A form which has given good service has the general section of a four-leaf clover with a central perforation.

The calcining of the prepared particles is an important step in the preparation of the final catalyst. 300° C. has been mentioned as the approximate temperature corresponding to the formation of the most effective polymerizing acid but advantages may be gained by exceeding this temperature and heating to about 500° C., after which the particles are given a steam treatment at the lower calcining temperature of 300° C. to rehydrate the acids formed in the high temperature calcining to a point more closely approaching the pyro than the meta acid in composition. The catalyst particles prepared by the scheme outlined are hygroscopic and should be preserved before use out of contact with moisture as much as possible.

Owing to the possibility of varying both the acid and absorbent ingredients which go to form the catalyst masses and of varying the form and size of the particles as well as the conditions of calcining and forming employed in their preparation, a number of alternative catalysts are producible each of which will have its own peculiar catalyzing and polymerizing character which will not be exactly equivalent to masses of different composition.

The polymerizing of gaseous olefins with catalysts of the present character may be brought about under numerous combinations of temperature and pressure, though the best results for any given pure olefin or mixture of olefins such as those encountered in the gases from oil cracking plants, will usually correspond to a particular set of conditions. It is a feature of the present type of catalyst that treatments may be conducted at temperatures as high at 250° C. and superatmospheric pressures up to several hundred pounds per square inch without danger of over-polymerization resulting in the formation of heavy tar-like polymers instead of liquids of gasoline boiling range.

In using the catalysts only simple equipment is necessary such as a tube or tower in which the preformed particles are placed as a filling material. The gases may be pumped up to some given pressure and preheated to a suitable temperature prior to passage through the catalyst mass or the catalyst chamber may be heated externally if desired. A few test runs will usually determine the best conditions of operation. For example, if the temperatures and pressures employed are such that the products exist in vapor phase, the flow of the gases through the catalyst may be upward through filled towers while if liquids are condensed therein, the best results may be obtained when down flows are used so that liquid does not accumulate on the surface of the catalyst. The washing effect of a downflow treatment tends not only to keep the catalyst particles clean but also prevents overcontacting with the development of higher boiling range polymers than can be utilized in motor fuel.

Solid phosphoric acid catalysts are characterized by their ability to polymerize olefins to produce relatively low boiling hydrocarbon polymers rather than heavy tars or pitches and by their long life due to the absence of such highly carbonaceous reaction products and also due to lack of oxidizing tendency in the phosphoric acid which constitutes the major portion thereof. In contrast to this it is notable that when employing sulfuric acid as a polymerizing agent, caution is necessary to prevent oxidation and undesirable side reactions such as ester formation and that, when employing metal halides such as aluminum chloride or zinc chloride, the tendency toward the formation of heavy polymers is very pronounced, so that it is not possible to produce more than minor amounts of desired low boiling hydrocarbon without the concurrent production of large quantities of heavy materials. Furthermore, solid phosphoric acid catalysts are readily regenerated after they have been contaminated by surface carbon deposits after long periods of service by merely burning off the deposits with air or other oxidizing gas at moderate temperatures. A still further advantage resides in the fact that they are substantially of a non-corrosive character as compared with the decided corrosive action of liquid phosphoric acid and other liquid polymerizing agents. When properly prepared the uniformly shaped particles have a very small tendency to break down under the conditions of temperature, pressure and gas flow obtaining during their use and regeneration so that they may be repeatedly used and restored without development of any large amounts of fines.

The following example of results obtained in polymerizing olefinic gases when using catalysts of the type comprised within the scope of the invention is characteristic though a number of others are available.

Parallel tests were run in which a regularly formed solid phosphoric acid catalyst was compared with a sized granular material having the same chemical composition. The initial mix in the preparation of each catalyst was made by intimately commingling 60% by weight of pyrophosphoric acid and 40% by weight of kieselguhr at a temperature of approximately 180° C. To make the granular catalyst particles the pasty mix was heated for 20 hours at 300° C. and the cake was ground and sized in a substantially dry atmosphere to give a substantial yield of particles of from 4 to 10 mesh. To make the regularly formed catalyst particles from the same original mix the material was extruded through a plate having holes corresponding to a four-leaf clover approximately 8 mm. in diameter and having a central opening 3 mm. in diameter. The prismatic extrudate was cut into lengths of 8 mm., and the forms were then heated at the same temperature until they were sufficiently dehydrated as in the case of the preparation of the granular material. The two catalysts thus prepared were used as filler in similar vertical cylindrical treating towers through which a gas mixture containing approximately 40% of propylene and higher olefins was passed downwardly at a temperature of 475° F. and a pressure of 155 lbs. per square inch. The following tabular summary shows the comparative results at an equal rate of gas flow:

|  | Granular catalyst | Formed catalyst |
| --- | --- | --- |
| Percent polymerization | 82 | 80 |
| Gravity of polymer product, °A. P. I. | 63.7 | 63.5 |
| Octane number | 81 | 81 |
| Weight of catalyst, lbs. per cu. ft. | 1.41 | 1.10 |
| Percent of voids | 60.9 | 63 |
| Pressure drop through catalyst bed, lbs. | 20 | 2 |

The granular catalyst also exhibited a greater tendency to produce fines during regeneration by air and steam so that the pressure drop after a period of regeneration was still higher than that indicated while there was substantially no change in the pressure drop through the formed catalyst after several periods of regeneration.

By the term "compressing" as used in the claims is meant molding, extruding, or otherwise forming the mixture referred to, under a pressure adequate to cause the material to assume the shape of the mold or die employed for this purpose.

The advantages of formed catalysts over those of graded particle size are evident from the preceding descriptive specification and the numerical data introduced in its support, although neither section is offered with the intention of unduly limiting the generally broad scope of the invention.

I claim as my invention:

1. A process for producing a polymerizing catalyst which comprises forming a pasty mixture of a phosphoric acid and a siliceous adsorbent, forming the paste into shaped bodies by extrusion and cutting, and calcining said bodies.

2. A process for producing a polymerizing catalyst which comprises forming a pasty mixture of a phosphoric acid and a siliceous adsorbent, extruding and cutting the paste into non-rectangular particles of uniform size and shape, and calcining the said particles.

KENNETH M. WATSON.